Nov. 19, 1946.   A. G. COOLEY   2,411,147
REMOTE CONTROL SYSTEM AND APPARATUS
Filed Oct. 28, 1943   4 Sheets-Sheet 4

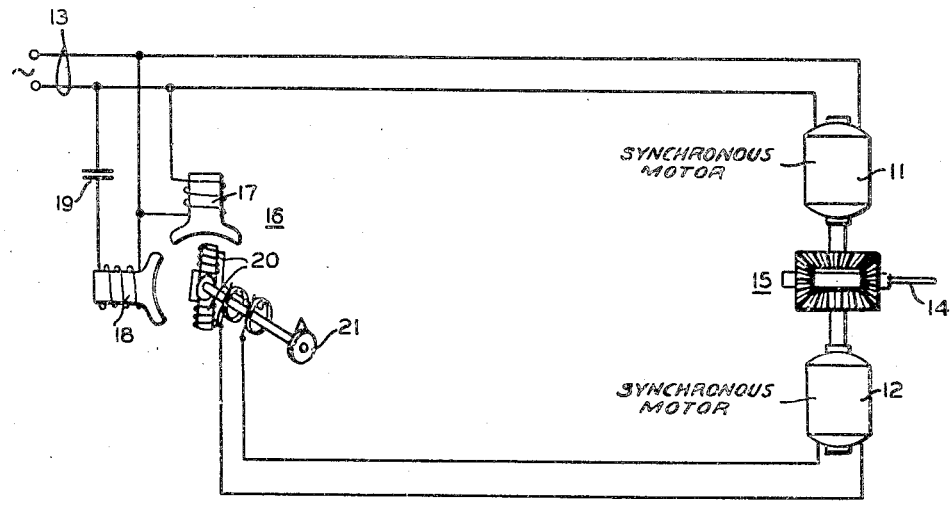
FIG. 1
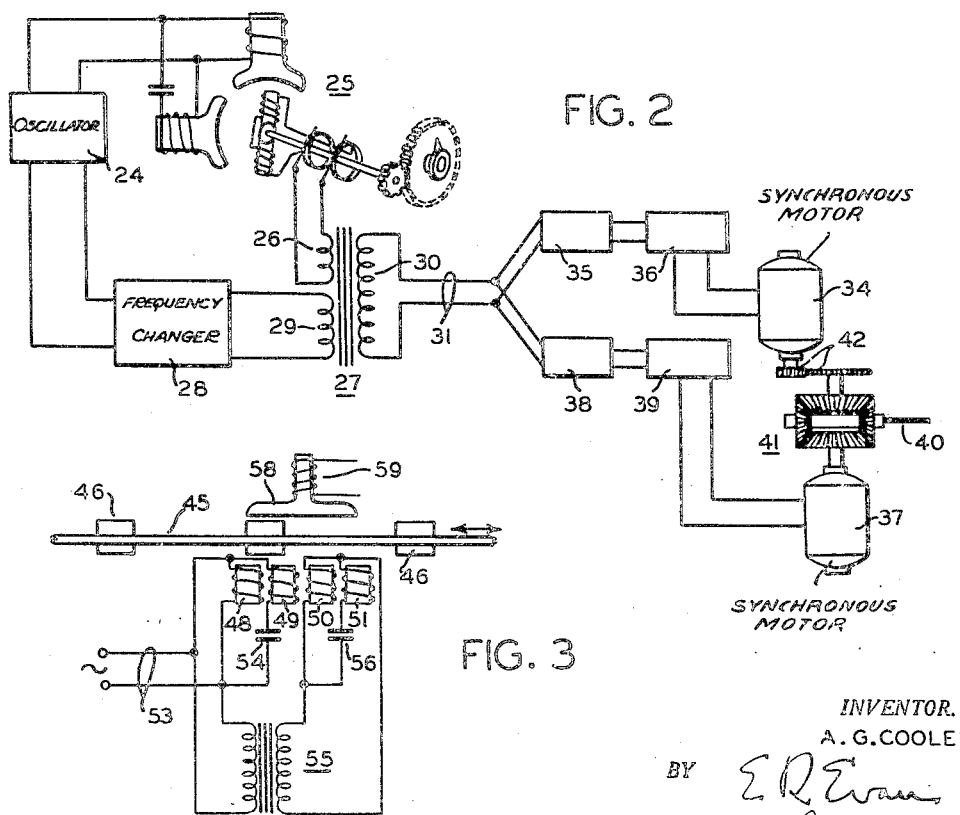
FIG. 2
FIG. 3
INVENTOR.
A. G. COOLEY

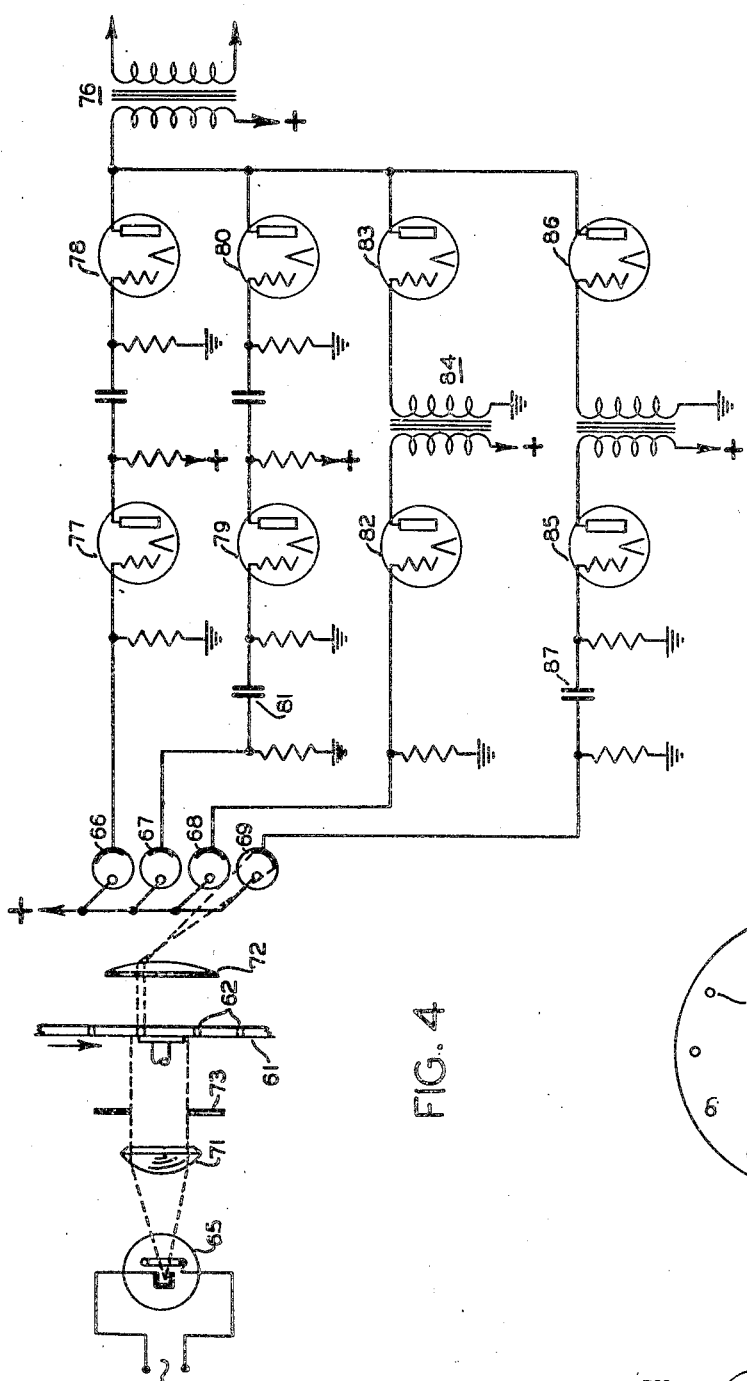
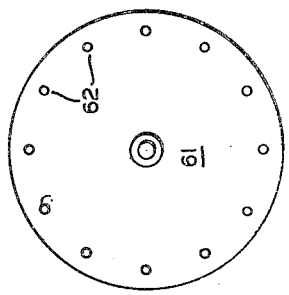
FIG. 4
FIG. 5

INVENTOR.
A. G. COOLEY

Patented Nov. 19, 1946

2,411,147

UNITED STATES PATENT OFFICE 2,411,147

REMOTE-CONTROL SYSTEM AND APPARATUS

Austin G. Cooley, New York, N. Y., assignor to Times Telephoto Equipment Inc., New York, N. Y., a corporation of New York Application October 28, 1943, Serial No. 508,041

6 Claims. (Cl. 172—239)

This invention relates to the remote control of the position of objects, such as guns, searchlights, pointers and the like, through the instrumentality of electric motors.

One object of the invention is to provide a remote control system in which the position of the movable object may be controlled with great precision and in which considerable power is available, if required.

Another object of the invention is to provide a system of the above-mentioned character in which the number of conductors or circuits between the control station and the receiving station is reduced to a minimum, and in which the construction of the apparatus employed is simpler than that heretofore proposed.

A further object of the invention is to provide an electrical remote control system in which the control current transmitted from the control station to the receiving station is of such character that it may be amplified at the receiving station to supply the operating power required at that point without introducing an error in the response of the motor mechanism.

A still further object of the invention is to provide improved control apparatus responsive to the difference in phase or frequency between two alternating currents.

In accordance with the invention, accurate control of an object to be positioned is effected by controlling the speed of a continuously rotating single-phase synchronous motor. In its preferred form, two synchronous motors or two synchronous elements of a combined motor are differentially connected to actuate the controlled (operating) member or shaft in accordance with the difference in speeds between the two motors or motor elements. The speed of one or both of the motor elements is controlled by varying the phase or frequency of the current or currents transmitted from the primary station or control station to the receiving station. The frequency of the control current is preferably of the order of 1000 or 2000 cycles per second, the motor element being constructed to run on current of this frequency and to follow variations in frequency to effect the desired control. The control current may be amplified at the receiving station without affecting the accuracy of control and may be transmitted over long high-resistance or inductive circuits without difficulty, since the essential characteristic of the control current, i. e., the frequency, will not be changed by alterations in the electrical characteristics of the connecting circuit or the amplifier.

Other objects and advantages of the invention will become apparent from the following description of the preferred embodiments thereof shown in the accompanying drawings, wherein Fig. 1 is a diagrammatic view of a remote control system utilizing two synchronous motors at the receiving station, one operating at constant speed and the other at variable speed.

Fig. 2 is a similar view of a system utilizing a single control circuit for a plurality of transmission channels.

Fig. 3 is a view of a modified form of phase-shifting means that may be used at the control station.

Fig. 4 illustrates another modification employing optical elements.

Fig. 5 is a plan view of the disc shown in Fig. 4.

Figure 6:
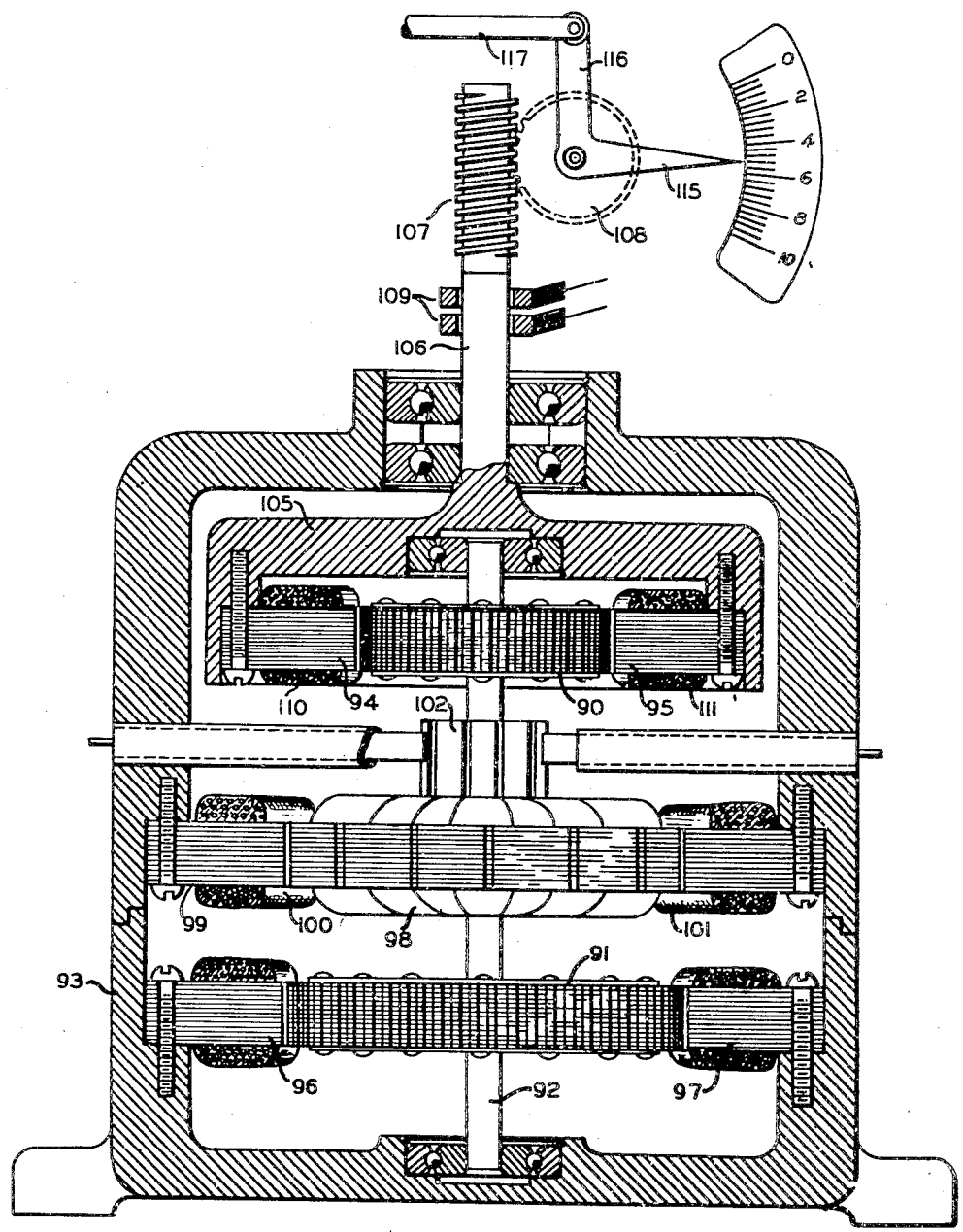
Fig. 6 illustrates a form of motor mechanism in which no differential gearing is required.

Referring to the drawings, Fig. 1 illustrates a remote control system comprising two single-phase synchronous motors 11 and 12 connected to an alternating-current supply circuit 13. The motors 11 and 12 are arranged to drive a member 14 (constituting or connected to an object to be controlled) through differential gearing 15, whereby the member 14 is moved in accordance with the difference in speeds of the motors 11 and 12.

In order to vary the relative speeds of the motors 11 and 12 to effect desired control of the member 14, means is provided to alter the phase or frequency of the current supplied to the motor 12. As shown, phase-shifting means 16 of the type capable of shifting phase more than 360° is connected between the supply circuit 13 and motor 12. The phase-shifting means 16 comprises two stationary field poles 17 and 18 disposed 90° apart and provided with windings connected to the circuit 13 directly and through a condenser 19, respectively. The capacity of the condenser 19 is such that the magnetization of one field pole is displaced 90° with respect to the other pole. The armature consists of two opposite salient poles 20 having windings connected in series so that the sum of the induced currents is substantially constant in any position of the armature and is retarded or advanced in phase as the armature is rotated by the hand-wheel 21. With the described arrangement, it will be evident that motor 11 rotates at a constant speed and the speed of motor 12 is dependent upon the adjustment of the phase-shifting means 16, the rotation of the armature of motor 12 being advanced or retarded two poles with respect to the armature of motor 11 for each complete revolution of the armature of the phase-shifting means.

The frequency of the alternating current supplied to the motors 11 and 12 is preferably of the order of 1000 or 2000 cycles and the motors may be of the reluctance or phonic wheel type similar to that described in my prior Patent No. 2,257,158, dated September 30, 1941. If desired, other synchronous motors of known design adapted to operate on the particular frequency chosen may be utilized in carrying out the invention. However frequencies in the so-called "audible-frequency" range are advantageous for many applications of the invention. In particular, control currents of this frequency may be transmitted at low power level and amplified at the receiving station in a vacuum-tube amplifier to increase the power available without affecting the accuracy of control. Furthermore, separate frequencies for driving the motors may be transmitted over a single control circuit and separated at the receiving station by conventional filters.

A system of this character is illustrated in Fig. 2 wherein an oscillator 24, for example of a frequency of 1800 cycles, is utilized to generate the control frequency. The oscillator 24 having a constant frequency output is connected through phase-shifting means 25, which may be similar to the phase-shifting means 16 of Fig. 1, to one primary winding 26 of a transformer 27. The oscillator 24 is also connected through a frequency changer 28 to a second primary winding 29 of transformer 27 so that a constant frequency of, say 1200 cycles, is applied to the winding 29. Currents of a frequency of 1800± cycles and of a constant frequency of 1200 cycles are induced in the secondary winding 30 of transformer 27, said secondary winding being connected to the control circuit 31. At the receiving station, a single-phase synchronous motor 34 is connected to the control circuit 31 through the 1800-cycle filter 35 and an amplifier 36, whereby the motor 34 is driven by the 1800-cycle component of the transmitted current, amplified as may be required to give the necessary power output. A second synchronous motor 37, similar to the motor 34 but driven at constant speed by the 1200-cycle component of the current in the control circuit, is connected to the control circuit through the 1200-cycle filter 38 and an amplifier 39. The member 40 to be controlled from the primary station or control station is connected through differential gearing 41 to be moved in accordance with variations in the speed of the motor 34 as the adjustment of the phase-shifting means 25 at the control station is changed. If the motors 34 and 37 have equal numbers of poles, the motor 34 will run on 1800-cycle current at one and one-half times the speed of the motor 37 on 1200-cycle current. Accordingly gearing 42 may be provided to establish the desired speed relation between the drive gears of the differential gearing 41 or, alternatively, the motors may be designed to run at the same speed on different frequencies.

It will be apparent that the object to be controlled may be positioned or moved, in the systems shown in Figs. 1 and 2, precisely in accordance with the adjustment of the phase-shifting means, and the accuracy of control is not affected by variations in the supply voltage or other variations which are likely to occur, such as the resistance, inductance or leakage resistance of the control circuit, or changes in the gain of the amplifiers. Considerable power is available, if required, and this power need not be transmitted over the control circuit. No attempt has been made to illustrate the exact proportions and structural details of the phase-shifting means 16, 25, as such devices are well known in the art and are described in prior publications, including my prior Patent No. 2,138,398, dated November 29, 1938.

A modified form of phase-shifting means which may be used at the control station in place of means 25 is illustrated in Fig. 3. This construction may be small and compact so that less torque is required and a greater phase shift obtained with a given angular displacement of the control member. As shown, it comprises a movable control member 45 in the form of a plate or vane which is integral with or secured to a compass or other instrument or control element. The movable vane 45 is provided with spaced iron inserts 46 supported for movement along a row of translating devices in the form of stationary electromagnets 48, 49, 50 and 51. The spacing between the inserts 46 is such that as the right-hand edge of one insert is moved to the middle of the core of the magnet 49, the left-hand edge of the next insert lies above the middle of the core of the electromagnet 51, and the width of the inserts is substantially equal to the distance between the central axes of adjacent magnet cores so that the magnetic flux induced in said inserts remains constant as the vane 45 is moved (assuming that the electromagnets are of equal strength).

The electromagnets 48, 49, 50 and 51 are connected to an alternating-current supply circuit 53, for example of a frequency of the order of 1000 or 2000 cycles. However a condenser 54 is connected in series with electromagnet 49 to displace the phase of the current traversing its coil 90°. Similarly, means such as a transformer 55 and condenser 56 is provided to displace the phase of the currents traversing the electromagnets 50 and 51 by 180° and 270°, respectively, with reference to that traversing the electromagnet 49. In this manner the algebraic sum of the fluxes in the insert 46 opposite the electromagnets is shifted in phase 360° as the insert is moved from a position approaching magnet 48 to a position beyond magnet 51 (or vice versa). A stationary magnetizable core 58 opposite the electromagnets 48—51 carries a pick-up coil 59 in which current is induced of the same frequency as that of the supply circuit 53 but retarded or advanced in phase by 360° as each insert 46 moves past the core 58. The terminals of the pick-up coil 59 are connected to the control channel, for example as illustrated in connection with the phase-shifting means 25 in Fig. 2. In this manner the speed of a synchronous motor at the remote station is varied in accordance with the movement or adjustment of a controlling member attached to the vane 45.

Another modified construction of phase-shifting means utilizing a series of translating devices of different character that may be employed at the primary or control station is shown in Figs. 4 and 5. In this arrangement, a pivoted disc 61 having a series of equally spaced holes 62 around its periphery is employed in an optical system to shift the phase of an alternating current to any desired extent (from a fraction of a cycle to several cycles or more). The disc 61 is arranged to be turned by the control element. In the particular embodiment illustrated, a fluctuating light source 65 is arranged to illuminate a series of photocells 66, 67, 68 and 69 through successive holes in the disc 61 as the latter is rotated. The light source 65 may be a neon glow-discharge or arc-discharge lamp connected to an alternating-current supply circuit of constant frequency whereby a pulsating light of constant frequency is obtained. A suitable optical system including planoconvex lenses 71 and 72, and an aperture plate 73, is constructed and arranged to cause the beam of light passing through the holes in the disc 61 to sweep over the photocells one after the other as the disc rotates.

The lenses 71, 72, and the aperture in the plate 73 are correlated with the size and spacing of the holes 62 and the location and extent of the cathodes of the photocells to insure that the total output current from the cell or cells illuminated at any instant remains substantially constant. The spacing of the holes 62 is such that as one hole moves past the edge of the aperture in the plate 73, the adjacent hole permits light from the source 65 to strike one of the end cells. Thus the photocells are successively and repeatedly illuminated with pulsating light from the lamp 65, always in the sequence 69—68—67—66 when the holes in the disc 61 traverse the light field in the direction indicated by the arrow, and in the sequence 66—67—68—69 for rotation of the disc in the opposite direction.

In accordance with the invention, the output currents of the respective cells are phase-controlled in a predetermined manner and combined in the primary winding of a transformer 76 so that a control voltage is generated in the secondary winding of said transformer which is uniformly and continuously shifted in phase as the disc 61 is rotated. As shown, a conventional two-stage amplifier comprising tubes 77 and 78 is provided for the photocell 66. A similar amplifier 79, 80 is provided for the photocell 67, except that a condenser 81 is connected in the input circuit of the tube 79 to displace the output current 90° with respect to that of the amplifier 77, 78. Likewise the amplifier 82, 83 for the photocell 68 includes a coupling transformer 84 so that the output current is displaced 180° with respect to that of the amplifier 77, 78; and the amplifier 85, 86 for the photocell 69 is similar to the amplifier 82, 83 except for the condenser 87 arranged to effect a further phase displacement of 90°, or a total of 270° with respect to the output current from the first cell 66. The phase-control arrangement illustrated is preferred but a modified arrangement may be employed in carrying out the invention if desired.

Instead of using two separate synchronous motors and differential gearing, as shown in Figs. 1 and 2, a unitary motor mechanism having two synchronous motor elements as shown in Fig. 6 may be used. Referring to this figure, a preferred form of motor mechanism comprises upper and lower toothed rotors 90 and 91 secured to a shaft 92 which is supported for rotation in the motor casing 93. Each of said rotors is disposed between a pair of salient field poles 94, 95 and 96, 97, respectively, thus forming two separate synchronous motors with their rotors mounted on the same shaft. Each rotor may be connected to the shaft 92 through a resilient connection, as described in my Patent No. 2,276,936, dated March 17, 1942. The shaft 92 also carries an armature 98 of a universal motor element which is employed to bring the synchronous motors up to speed in starting. The start motor includes a stationary core member provided with field windings 100 and 101, and a commutator 102 as shown. The field poles 94 and 95 are carried by a rotatable yoke or frame 105 on a shaft 106 projecting from the motor casing 93, said shaft being provided with a worm thread 107 at the upper end thereof meshing with a worm gear 108, and slip rings 109 through which current is supplied to the field windings 110, 111 on the field poles 94 and 95. The motor terminals, connecting leads and other conventional elements of the motor are not illustrated in detail for the sake of simplicity. The numbers of teeth in the rotors 90 and 91 have a predetermined ratio, say 2:3 in case frequencies of 1200 and 1800 cycles are supplied to the respective motor elements, so that normally there is no tendency for the field poles 94, 95 to rotate and the shaft 106 remains stationary. When the relative phase or frequency of the currents supplied to the motors is changed by the phase-shifting means at the control station, the shaft 106 is rotated to a corresponding extent. As shown, the worm gear 108 may be attached to a pointer 115 to indicate the change in adjustment of the control means at the control station. A bell-crank lever 116 and rod 117 may also be provided to actuate an object to be controlled. As stated, the mechanism described is merely illustrative of the principles of the invention and the structural details may be widely varied without departing from the invention.

Figure 7:
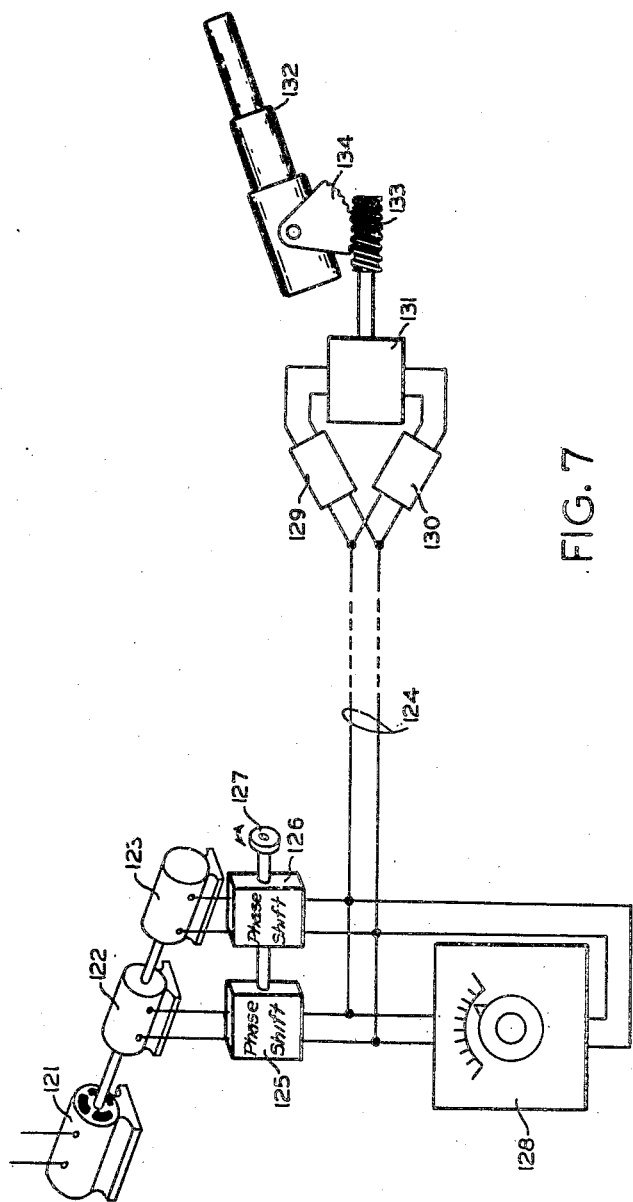
Fig. 7 is a diagrammatic view of another modification of the system according to the invention.

Another modification of the remote control system embodying the invention is shown in Fig. 7. Referring to this figure, an electric motor 121 is shown at the primary or control station, said motor being arranged to drive two alternating-current generators 122 and 123 to generate control currents of constant frequencies, say 1200 and 1800 cycles per second. The generators 122 and 123 are connected to the control circuit 124 through two phase-shifting devices 125 and 126. These devices may be similar to that shown in Fig. 1, 3 or 4, and are arranged for control in the opposite sense by a hand-wheel 127, i. e., the phase of the output currents from the generators is shifted in opposite directions when the hand-wheel 127 is turned, thus providing a more rapid change in the frequency ratio of the control currents. A position indicator 128 is also shown at the control station to indicate to the operator or attendant the position of the controlled device at the remote station. This position indicator may be constructed like the synchronous-motor mechanism of Figs. 1 and 2, or that shown in Fig. 6, and may also be used at the control station in the systems of Figs. 1 and 2, if desired. A filter-amplifier 129 for the 1200-cycle current and a second filter-amplifier 130 for the 1800-cycle current are connected between the control circuit and the motor mechanism 131. The latter may be similar to that shown in Figs. 1 and 2 or Fig. 6, and is shown as arranged to control the elevation of a gun 132 by means of a worm 133 and worm gear 134. Obviously the system may be utilized to control the position of other objects, as already explained.

It is to be understood that the invention is not limited to the details of the mechanisms illustrated by way of example, and that these may be modified without departing from the scope of the invention as defined in the appended claims.

I claim:

1. In a remote control system, in combination, an object to be controlled, motor mechanism arranged to position said object, said motor mechanism comprising two single-phase synchronous motors and a pivoted actuating member tuned in accordance with the difference in rotative speeds of said motors, a single control circuit to said motors, means for supplying relatively variable frequency alternating currents to said control circuit and for separating the currents at the end of said circuit adjacent the motors to vary the relative speeds of said motors and thereby control the position of said object.

2. In a remote control system, in combination, a control circuit, a constant-frequency source of alternating current, phase-adjusting means of the type capable of shifting phase more than 360° interposed between said source and said control circuit, a frequency changer also interposed between said source and said control circuit and a control actuating device including a continuously rotating synchronous motor connected to said control circuit whereby its rotative speed at any particular moment is affected by operation of said phase-adjusting means, said actuating device further comprising a second motor and tuning means for rendering said second motor responsive to the output current of said frequency changer.

3. In a remote control system, in combination, a control station, a receiving station, a control circuit connecting said stations, a source of audio-frequency current at the control station, means including said source for impressing currents of two different frequencies on said control circuit, filters at the receiving station for separating said currents of different frequencies, motor means at the receiving station connected to said control circuit and responsive to both said currents, a movable control element at the control station and means including said control element for shifting the phase or frequency of one of said currents in the control circuit to effect a corresponding response of the motor means at the receiving station.

4. In a remote control system, in combination, a control station, a receiving station, a control circuit between said stations consisting of a single circuit, an audio-frequency oscillator at the control station, means for deriving currents of two different frequencies from said oscillator and for varying the difference between said frequencies, means for impressing both currents on said control circuit, filter means at the receiving station for separating said currents of different frequencies, synchronous motor means at the receiving station connected to be responsive to the transmitted currents of both frequencies and a controlled member actuated by said motor means in accordance with variations in the frequencies of said currents.

5. In a remote control system, in combination, a control station, a receiving station, an oscillator at the control station, a frequency changer connected to said oscillator, means for combining the output currents of said oscillator and said frequency changer, phase shifting means for swinging the frequency of one current relative to the other, means for transmitting the relatively variable-frequency currents to the receiving station, a movable member to be controlled at the receiving station and differential motor means for actuating said movable member connected to be responsive to the frequencies of the transmitted currents.

6. In a remote control system, in combination, an object to be controlled, a control circuit, means for generating alternating current of constant frequency, a frequency changer connected to said generating means, and arranged to provide output current of a different constant frequency, means for impressing the output currents of said generating means and said frequency changer upon said control circuit and for varying the phase or frequency relation between the resultant currents of different frequencies traversing said control circuit, filters for separating the last-mentioned currents at the remote end of the circuit, rotating synchronous motor means connected thereto to operate at relative speeds dependent upon the changes in the phase or frequency relation between the currents traversing the control circuit and a connection between said motor means and the controlled object to move said object in accordance with the changes in said phase or frequency relation.

AUSTIN G. COOLEY.